(12) United States Patent
Ekstam

(10) Patent No.: US 6,729,310 B2
(45) Date of Patent: May 4, 2004

(54) FUEL DELIVERY SYSTEM

(76) Inventor: Charles L. Ekstam, 1230 Duane Swift Pkwy., Jefferson City, MO (US) 65109

( * ) Notice: Subject to any disclaimer, the term of this patent is extended or adjusted under 35 U.S.C. 154(b) by 192 days.

(21) Appl. No.: 09/883,695

(22) Filed: Jun. 18, 2001

(65) Prior Publication Data
US 2002/0170545 A1 Nov. 21, 2002

Related U.S. Application Data

(60) Provisional application No. 60/270,647, filed on Feb. 20, 2001.

(51) Int. Cl.⁷ ............................................. F02M 37/04
(52) U.S. Cl. ....................... 123/516; 123/557; 123/541
(58) Field of Search ................... 123/557, 510, 123/514, 516, 456, 541

(56) References Cited

U.S. PATENT DOCUMENTS

| | | |
|---|---|---|
| 980,282 A | 1/1911 | Junggren |
| 1,063,633 A | 6/1913 | Wilkinson |
| 1,269,787 A | 6/1918 | Church |
| 2,222,274 A * | 11/1940 | Antonsen ..................... 123/516 |
| 2,522,565 A | 9/1950 | Burhans |
| 2,630,228 A | 3/1953 | Wright et al. |
| 2,642,148 A | 6/1953 | Grise |
| 2,902,162 A | 9/1959 | Humbert, Jr. |
| 2,937,756 A | 5/1960 | Humbert, Jr. |
| 3,194,401 A | 7/1965 | Banker |
| 3,224,585 A | 12/1965 | Scavuzzo |
| 3,256,989 A | 6/1966 | Hultgren |
| 3,262,570 A | 7/1966 | Gailitis et al. |
| 3,740,057 A | 6/1973 | Doyle et al. |
| 3,806,287 A | 4/1974 | Sadler et al. |
| 3,859,216 A | 1/1975 | Sisson |
| 3,905,450 A | 9/1975 | Persson |
| 4,010,960 A | 3/1977 | Martin |
| 4,231,718 A | 11/1980 | Ruhl et al. |
| 4,368,716 A | 1/1983 | Davis |
| 4,372,847 A | 2/1983 | Lewis |
| 4,395,997 A | 8/1983 | Lee, Sr. |
| 4,411,239 A | 10/1983 | Kelch |
| 4,411,240 A | 10/1983 | Kravetz ..................... 123/557 |
| 4,416,108 A | 11/1983 | Ghandhi |
| 4,454,848 A | 6/1984 | Duprez |
| 4,495,069 A | 1/1985 | Davis |
| 4,539,965 A | 9/1985 | Soltau |
| 4,543,938 A | 10/1985 | Szlaga |
| 4,754,741 A * | 7/1988 | Houtman ..................... 123/552 |
| 4,763,684 A | 8/1988 | Kelch |
| 4,764,275 A | 8/1988 | Robichaud |
| 4,933,093 A | 6/1990 | Keller |
| 4,979,482 A | 12/1990 | Bartlett |
| 5,039,284 A | 8/1991 | Talaski ..................... 417/366 |
| 5,080,787 A | 1/1992 | Brown et al. |
| 5,095,880 A | 3/1992 | Ricks |
| 5,103,793 A | 4/1992 | Riese |
| 5,114,572 A | 5/1992 | Hunter et al. |
| 5,203,306 A | 4/1993 | Billingsley |

(List continued on next page.)

FOREIGN PATENT DOCUMENTS

| | | |
|---|---|---|
| GB | 1216653 | 12/1970 |
| JP | 210355 | 12/1983 |
| SU | 1573281 | 6/1990 |

OTHER PUBLICATIONS

Cummins, Service Topics Dated Jul. 1, 1965 (9 pages).

*Primary Examiner*—Carl S. Miller
(74) *Attorney, Agent, or Firm*—Suelthaus & Walsh, P.C.

(57) ABSTRACT

A diesel fuel delivery system contains a variety of components that individually and in combination improve fuel economy and reduce environmental pollution. System improvements include a neck-stabilized check valve body, a fuel heating system, a screen water separator, a stress relieving groove in a fuel pump cavity, a divider wall in the filter head, an inverted cup formed in the filter head with improved positioning of the fuel ports, and a non-spilling filter head for use in retaining fuel while changing the fuel filter.

28 Claims, 9 Drawing Sheets

U.S. PATENT DOCUMENTS

| | | |
|---|---|---|
| 5,207,794 A | 5/1993 | Erdal |
| 5,230,812 A | 7/1993 | Williams |
| 5,231,967 A | 8/1993 | Baltz |
| 5,287,841 A | 2/1994 | Forsythe |
| 5,300,223 A | 4/1994 | Wright |
| 5,339,787 A | 8/1994 | Jungquist |
| 5,355,860 A | 10/1994 | Ekstam |
| 5,389,245 A | 2/1995 | Jaeger |
| 5,529,314 A | 6/1996 | Ekstam |
| 5,746,184 A | 5/1998 | Ekstam |
| 5,896,846 A | 4/1999 | Bauer et al. ............... 123/510 |
| 6,257,208 B1 * | 7/2001 | Harvey .................. 123/516 |

* cited by examiner

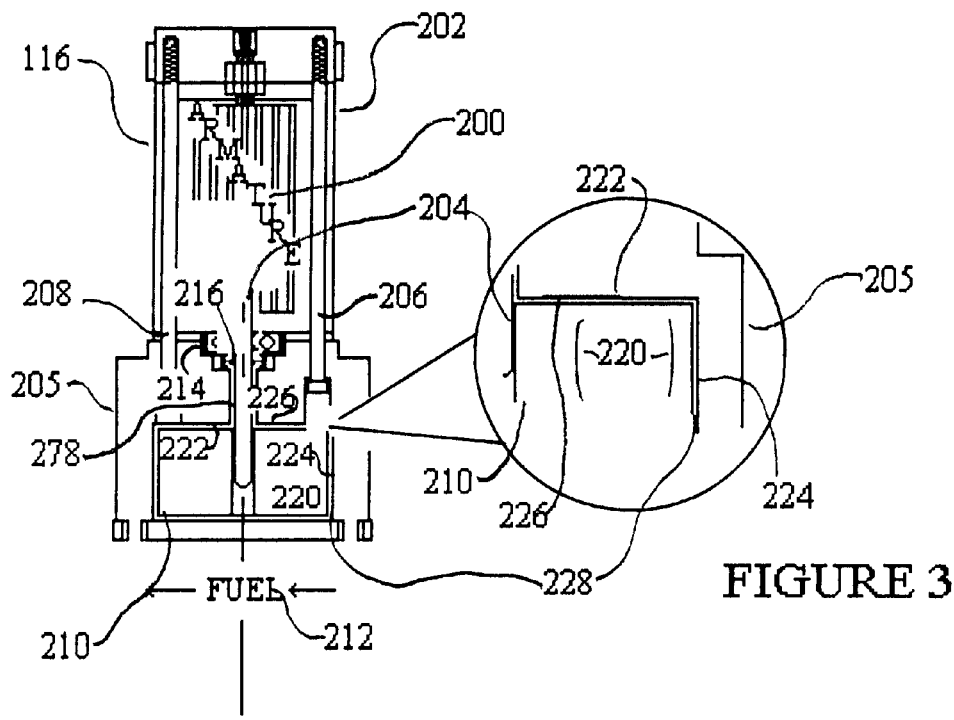
FIGURE 2
FIGURE 3
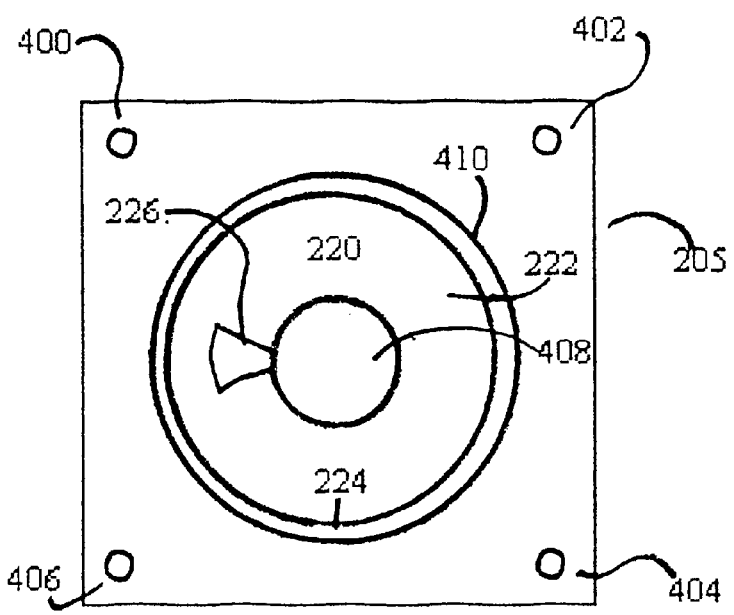
FIGURE 4

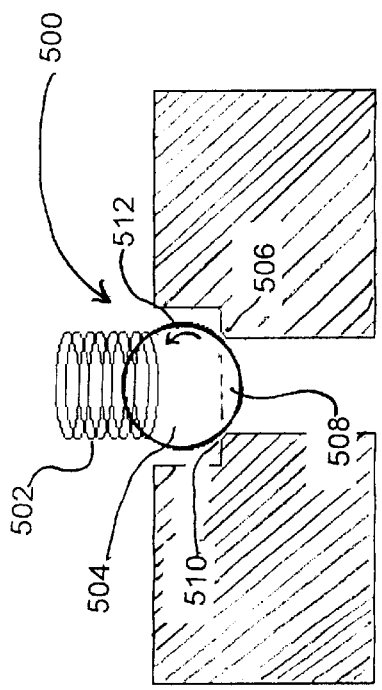
FIGURE 5
PRIOR ART
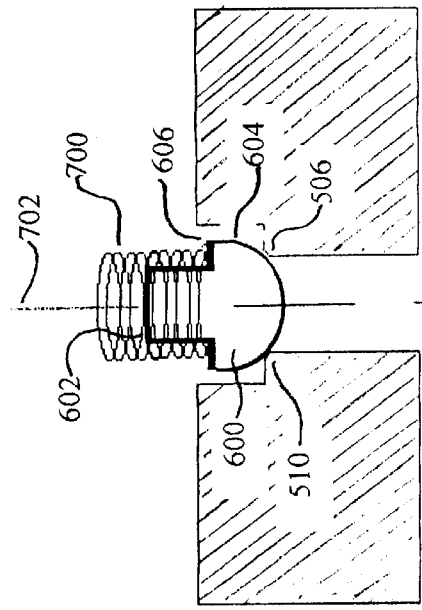
FIGURE 7
FIGURE 6

| Filter | | FF-104 | FF-105 | FF211 | FS-1000 | FP-805 | FS-1000 (805 Can) | FF-105 (805 Can) |
|---|---|---|---|---|---|---|---|---|
| Filter Element Material | | Pleated Cellulose | | | Pleated Cellulose With outer layer of Microglass | Pleated Cellulose | Micro-glass | Pleated Cellulose |
| Pore Size Microns | H | 25 | 25 | 25 | 10 | 10 | 10 | 25 |
| Filter Element Surface Area Sq. In. | | 282 | 345 | 1190 | 678 | 667 | 678 | 345 |
| Can Height Inches | J | 4.5 | 4.875 | 10.75 | 8.25 | 10 | 10 | 10 |
| Can Interior Diameter Inches | G | 3.625 | 3.625 | 4.25 | 3.625 | 4.9375 | 4.9375 | 4.9375 |
| Fuel Inlet Port Diameter Inches | A | 0.25 | 0.25 | 0.25 | 0.25 | 0.5 | 0.5 | 0.5 |
| Filter Element Cap Dia. Inches | F | 3.5 | 3.5 | 4 | 3.5 | 4.5 | 3.5 | 3.5 |
| Filter Element Height | I | 3.9375 | 4.25 | 9 | 6.5 | 7.75 | 6.5 | 4.25 |
| Clearance | | | | | | | | |
| Filter Element Cap to top Plate | D | 0.1 | 0.1 | 0.12 | 0.1875 | 0.5 | 0 | 0 |
| Filter Element Cap to Top Plate Sq. In. | | 1.09 | 1.09 | 1.5 | 2.06 | 7.06 | 0 | 0 |
| Filter Element Cap to Inner Wall | C | 0.0625 | 0.0625 | 0.0625 | 0.0625 | 0.1875 | 0.6875 | 0.6875 |
| Total Area Clearance-Filter Cap to Inner Wall Sq. In. | | 0.699 | 0.699 | 1.61 | 0.699 | 3.241 | 9.521 | 9.521 |
| Fuel Inlet Port Holes Total Area Sq. In. | | 0.3925 | 0.3925 | 0.3925 | 0.3925 | 2.355 | 2.355 | 2.355 |

A. Fuel inlet ports to fuel filter.
B. Top plate.
C. Vertical clearance between filter element cap and outer can.
D. Horizontal clearance between filter top plate and element cap.
E. Filter outer can.
F. Filter element diameter.
G. Filter can outer diameter.
H. Filter element.
I. Filter element vertical dimension.
J. Filter can vertical dimension.

FIG. 12

A LISTING OF FILTERS TESTED WITH THEIR DIMENSIONS, INTERNAL CLEARANCES, AND FEATURES.

| | | Flow Velocity Ft/Sec = GPM X 231 ÷ Total Area ÷ 720 | | | | | | | | |
|---|---|---|---|---|---|---|---|---|---|---|
| | | Flow | | | | | | | | |
| | | GPH | 30 | 54 | 105 | 1.65 | 225 | 285 | 345 | 405 |
| A' | Total Area | GPM | 0.5 | 0.9 | 1.75 | 2.75 | 3.75 | 4.75 | 5.75 | 6.75 |
| Fuel Inlet Port Holes | In Sq. Inch | Velocity | | | | | | | | |
| 1/4-0.25 | 0.3925 | Ft/Sec | 0.480 | 0.735 | 1.429 | 2.25 | 3.065 | 3.88 | 4.7 | 5.517 |
| 5/16-0.3125 X 8 | 0.6132 | | 0.262 | 0.471 | 0.915 | 1.438 | 1.96 | 2.485 | 3.008 | 3.531 |
| 3/8-0.375 X 8 | 0.8831 | | 0.182 | 0.327 | 0.635 | 0.999 | 1.362 | 1.725 | 2.08 | 2.452 |
| 7/16-0.4375 X 8 | 1.202 | | 0.133 | 0.24 | 0.467 | 0.734 | 1.001 | 1.267 | 1.534 | 1.801 |
| 1/2-0.5 X 8 | 2.355 | | 0.068 | 0.123 | 0.238 | 0.374 | 0.51 | 0.647 | 0.783 | 0.919 |
| FP-805X12 | | | | | | | | | | |
| B' | Total Area | | | | | | | | | |
| Clearance-Filter Cap to Top Plate Filter | In Sq. Inch | | | | | | | | | |
| FF-104 | 1.09 | | 0.147 | 0.264 | 0.515 | 0.809 | 1.103 | 1.398 | 1.692 | 1.986 |
| FF-105 | 1.09 | | 0.147 | 0.264 | 0.515 | 0.809 | 1.103 | 1.398 | 1.692 | 1.986 |
| FF-211 | 1.5 | | 0.107 | 0.192 | 0.374 | 0.588 | 0.802 | 1.015 | 1.229 | 1.443 |
| FS-1000 | 2.06 | | 0.078 | 0.14 | 0.272 | 0.428 | 0.584 | 0.739 | 0.895 | 1.051 |
| FP-805 | 7.06 | | 0.023 | 0.04 | 0.079 | 0.125 | 0.17 | 0.215 | 0.261 | 0.306 |
| FS-1000 Element in 805 Can | 10.99 | | 0.015 | 0.026 | 0.051 | 0.08 | 0.109 | 0.138 | 0.167 | 0.197 |
| C' | Total Area | | | | | | | | | |
| Clearance-Filter Cap to Inner Wall Filter | In Sq. Inch | | | | | | | | | |
| FF-104 | 0.699 | | 0.229 | 0.413 | 0.803 | 1.262 | 1.721 | 2.18 | 2.639 | 3.098 |
| FF-105 | 0.699 | | 0.229 | 0.413 | 0.803 | 1.262 | 1.721 | 2.18 | 2.639 | 3.098 |
| FF-211 | 1.61 | | 0.099 | 0.179 | 0.348 | 0.548 | 0.747 | 0.946 | 1.145 | 1.345 |
| FS-1000 | 0.699 | | 0.229 | 0.413 | 0.803 | 1.262 | 1.721 | 2.18 | 2.639 | 3.098 |
| FP-805 | 3.241 | | 0.049 | 0.089 | 0.173 | 0.272 | 0.371 | 0.47 | 0.569 | 0.668 |
| FS-1000 in 805 Can | 9.521 | | 0.017 | 0.03 | 0.058 | 0.092 | 0.126 | 0.16 | 0.193 | 0.227 |

A LISTING OF FILTERS TESTED WITH THE "SUM TOTAL AREA" GIVEN OF CRUTIAL INTERNAL FLOW AREAS AND THE FLOW VELOCITY IN FEET PER SECOND THROUGH THESE AREAS AT THE DIFFERENT INPUT FLOW RATES.

FIG. 13

| A'...Fuel Inlet Holes (Filter Top Plate) Clearance | | | Flow | | | | | | | | | |
|---|---|---|---|---|---|---|---|---|---|---|---|---|
| B'...Filter Cap to Top Plate Clearance | | | GPH | 30 | 54 | 105 | 165 | 225 | 285 | 345 | 405 | |
| C'...Filter Cap to Filter Can Inner Wall Clearance | | | GPM | 0.5 | 0.9 | 1.75 | 2.75 | 3.75 | 4.75 | 5.75 | 6.75 | |
| | | Total Area In Sq. Inch | | | | | | | | | | |
| FF-104 | | | | | | | | | | | | |
| A' | 1/4-0.25 X 8 | 0.3925 | Velocity Ft/Sec | 0.408 | 0.735 | 1.429 | 2.25 | 3.065 | 3.88 | 4.7 | 5.517 | |
| B' | | 1.09 | | 0.147 | 0.264 | 0.515 | 0.809 | 1.103 | 1.398 | 1.692 | 1.986 | |
| C' | | 0.699 | | 0.229 | 0.413 | 0.803 | 1.262 | 1.721 | 2.18 | 2.639 | 3.098 | |
| FF-105 | | | | | | | | | | | | |
| A' | X 8 | 0.3925 | | 0.408 | 0.735 | 1.429 | 2.25 | 3.065 | 3.88 | 4.7 | 5.517 | |
| B' | | 1.09 | | 0.147 | 0.264 | 0.515 | 0.809 | 1.103 | 1.398 | 1.692 | 1.986 | |
| C' | | 0.699 | | 0.229 | 0.413 | 0.803 | 1.262 | 1.721 | 2.18 | 2.639 | 3.098 | |
| FF-211 | | | | | | | | | | | Ft/Sec | |
| A' | X 8 | 0.3925 | | 0.408 | 0.735 | 1.429 | 2.25 | 3.065 | 3.88 | 4.7 | 5.517 | |
| B' | | 1.5 | | 0.107 | 0.192 | 0.374 | 0.588 | 0.802 | 1.015 | 1.229 | 1.443 | |
| C' | | 1.61 | | 0.099 | 0.179 | 0.348 | 0.548 | 0.747 | 0.946 | 1.145 | 1.345 | |
| FS-1000 | | | | | | | | | | | | |
| A' | X 8 | 0.3925 | | 0.408 | 0.735 | 1.429 | 2.25 | 3.065 | 3.88 | 4.7 | 5.517 | |
| B' | | 2.06 | | 0.078 | 0.14 | 0.272 | 0.428 | 0.584 | 0.739 | 0.895 | 1.051 | |
| C' | | 0.699 | | 0.229 | 0.413 | 0.803 | 1.262 | 1.721 | 2.18 | 2.639 | 3.098 | |
| FP-805 | | | | | | | | | | | Ft/Sec | |
| A' | X12 | 2.355 | | 0.068 | 0.123 | 0.238 | 0.374 | 0.51 | 0.647 | 0.783 | 0.919 | |
| B' | | 7.06 | | 0.023 | 0.04 | 0.079 | 0.125 | 0.17 | 0.215 | 0.261 | 0.306 | |
| C' | | 3.241 | | 0.049 | 0.089 | 0.173 | 0.272 | 0.371 | 0.47 | 0.569 | 0.668 | |
| FS-1000 Element in 805 Can | | | | | | | | | | | | |
| A' | X12 | 2.355 | | 0.068 | 0.123 | 0.238 | 0.374 | 0.51 | 0.647 | 0.783 | 0.919 | |
| B' | | 10.99 | | 0.015 | 0.026 | 0.051 | 0.08 | 0.109 | 0.138 | 0.167 | 0.197 | |
| C' | | 9.521 | | 0.017 | 0.03 | 0.058 | 0.092 | 0.126 | 0.16 | 0.193 | 0.227 | |

FIG. 14

A LISTING BY FILTER WITH THE "SUM TOTAL AREA" GIVEN OF CRUTIAL INTERNAL FLOW AREAS AND THE FLOW VELOCITY IN FEET PER SECOND THROUGH THESE AREAS AT THE DIFFERENT INPUT FLOW RATES.

FUEL DELIVERY SYSTEM

RELATED APPLICATIONS

This application claims benefit of priority to provisional application serial No. 60/270,647 filed Feb. 20, 2001, which is hereby incorporated by reference.

BACKGROUND OF THE INVENTION

1. Field of the Invention

The present invention relates to methods and apparatus in the field of fuel supply systems for internal combustion engines and, more specifically, to systems having components that cooperate to remove contaminants, such as entrained air, from an incoming fuel supply such as diesel fuel.

2. Statement of the Problem

Typical fuel supply systems for diesel engines operate on the principle of a vacuum feed system in which fuel resides within a fuel tank that feeds fuel through a fuel line to a transfer pump or a fuel pump. A fuel filter is most often positioned in the fuel line to remove particles and water from the incoming fuel supply. The fuel line feeds the fuel to an inlet of the transfer pump or fuel pump, which operates to pressurize the fuel for delivery to a fuel injector. Various mechanical and electromechanical linkages exist for fuel delivery, such as distributor-type pumps or electronic control module (ECM) systems that deliver fuel from a common rail system.

Operational deficiencies and inefficiencies of the diesel engine are well known, but commercial implementations of such engines have failed to address known problems. Diesel engines lose power, develop increased exhaust smoke, increased fuel consumption and throttle response symptoms as the fuel filter plugs with use. High-speed diesel engines for use in automotive and marine applications lose torque at higher revolutions. Engine power output is derated for operation at higher altitudes. The industry has simply accepted the fact that such engines operate better on some days than others, and has not sufficiently investigated or corrected the problem, which may be observed by visible changes in the exhaust from a given engine at different times.

The aforementioned problems are commonly perceived to involve timing changes, and the industry has addressed these by the development of "ECM" technology. Diesel fuel injection systems are primarily hydraulic systems, whether they are mechanically timed or electronically controlled. The injector timing must be precise to a millisecond or engine efficiency suffers. According to the principles of operation for diesel engines, the injectors are timed to deliver fuel to a compressed air body that resides within a piston-cylinder assembly as the piston rises towards top dead center (TDC), i.e., the top of the stroke. The heat created by pressure is sufficient to cause ignition of the fuel as it combines with oxygen in the air. The injector pulse ideally delivers a spray of fuel at an instantaneous point in time, but the reality is that the spray persists for only an instant, e.g., about five milliseconds or less at idle. Thus, engine performance is optimized for initialization of the injector timing at a point in time prior to when the piston reaches TDC. Combustion byproducts, such as nitrous oxide and particulates, are reduced by this optimization. Additional features of optimized engine performance include an optimized conical spray pattern geometry and a spray of minimum duration. Entrained air on the pressurized side of the diesel injector pump disrupts the spray pattern, retards the injection timing, and on 'ECM' controlled engines, increases the duration of the injection, all of which reduces the available power from the engine and result in incomplete fuel combustion.

U.S. Pat. Nos. 5,746,184 and 5,355,860 to Ekstam both address fuel delivery systems for diesel engines, and are hereby incorporated by reference to the same extent as though fully disclosed herein. These patents provide a significant advance in the art by demonstrating that diesel engine performance can be enhanced through the use of an air-fuel separation system that removes entrained air from the fuel. These systems are now sold commercially under the trademark FUEL PREPARATOR® as retrofit devices for diesel engines and consistently provide significant improvements to fuel economy together with reduced particulate matter, carbon monoxide, and NOX emissions. According to U.S. Pat. No. 5,746,184, fuel is fed to the filter under a positive pressure where the filter has pore openings sized smaller than 25 microns and, preferably, of about 15 microns.

The vacuum feed concept of fuel pump intake systems has lead to commercial implementations of fuel transfer and injector pumps having vacuum and cavitation problems that add vapor phases of air and flashed fuel vapor to the fuel. It has been documented that the air which is usually dissolved in a fuel is pulled out of solution at the inlet side of these pumps due to suction at the intake. A greater vacuum pressure or suction is associated with increased chances of cavitation that further increases the amount of vapor that is entrained in the fuel. U.S. Pat. No. 5,539,214 to Ekstam, which is hereby incorporated by reference to the same extent as though fully disclosed herein, teaches the use of a fuel-fed double seal assembly providing improved isolation of intake and outlet sides of a fuel pump.

Various regulatory agencies including federal, state and municipal governments are studying the environmental problems associated with diesel emissions. The primary problems are that diesels emit a relatively disproportionate share of NOX and particulate emissions, which result in an unsightly brown cloud. The particulates are increasingly suspected or implicated as a cause of respiratory problems. Various regulatory schemes have been proposed or implemented to address these problems. There is a real and growing danger that diesel engines, as they are presently constructed, will be unable to meet future emissions requirements without substantial changes to diesel fuels and the use of particulate traps. Although the currently manufactured and commercially marketed model of U.S. Pat. Nos. 5,355,860 and 5,746,184, work well, filter design and size relationship to the device could cause models with greater volume and flow capacity to become quite large and bulky.

SOLUTION

The present invention overcomes the problems that are outlined above by providing further enhancements to fuel delivery systems and methods. In combination and as individual components, these enhancements result in improved fuel economy and reduced emissions across a wide variety of diesel engine applications.

One aspect of the fuel delivery system described herein is to provide improvements to prior air-fuel separation systems.

For example, an electronic heating element that is integrally formed with the air-fuel separation system may be used to heat fuel for preconditioning prior to air-fuel separation, i.e., the heating element may be disposed upstream in a flow pathway with respect to the air-fuel separation system. The electronic heating element may be operably configured to receive electricity from a source external to a vehicle on which the air-fuel separation system is installed, or it may be adapted internally to receive electricity from an on-board electrical generator or alternator.

Another such aspect involves the use of check valves having a coil spring and a valve member, wherein the valve member has a shaft received within the coil spring and a semispherical head connected to the shaft. This assembly may be provided as a retrofit assembly to existing systems, such as the aforementioned FUEL PREPORATOR®, to prevent or remediate failure of prior spring and ball valves due to groove wear under conditions of long-standing use.

Another such aspect involves the water separator. To operate properly the device must have an unrestricted flow of fuel that is relatively free of water and foreign objects that could render the transfer pump inoperative. Water separators can be made of many different materials such as cellulose, microglass, wire or synthetic screen or combinations thereof. Many fuel filters are marketed as combination fuel filter-water separators. Many of these products plug quickly with use and restrict fuel flow. Should any of these products find their way into use on an air separator device, they could cause operational failures of the air-separation device. The water separator must not create restriction of fuel flow to the device, therefore, the design is most important. The material best suited for the element of the water separator is screen, either wire or synthetic. The pore opening of the water separator screen could be from 30 microns to 144 microns. However, 70 to 100 microns is preferred. The screen is pleated to increase surface area of the water separator. The surface area of the stripper screen should be sufficient to reduce the flow/pressure of the fuel so as not to force any water through the screen with normal use. This assembly may be provided as a retrofit assembly to existing systems, such as the aforementioned FUEL PREPORATOR®.

Another such aspect involves the fuel filter. The conventional design concept for spin-on fuel filters commonly used by and available to the consumer addresses the removal of the accepted contaminates, liquids and particulates, normally thought to be in the diesel fuel. This concept dictates the pore rating of the filter media, and void volume or capacity of the filter media. Also, the clearances and passages within the filter are only adequate for the flow considerations i.e., single phase or one directional flow, affecting restriction to be within operating constraints of the application equipment. As described herein, improvements to these conventional filters are provided because it is now recognized that additional performance demands are imposed when filters are used for air separation and removal. Therefore, the design of the conventional filters are modified to better enable them to meet the performance demands involving the process of air-vapor separation from liquids, such as diesel fuel or other petroleum based liquids.

It is well known that petroleum based liquids can contain large volumes of entrained air. These volumes of air-vapor that become entrained in diesel fuel or that develop within the system can greatly exceed the ability of the filter to contain or store the air-vapors until the filter is changed as is the case with particulate contaminates. The separation and removal of air-vapor is a continuous process. The entrained air/vapor is separated by the phenomena of the wetted porous paper resistance to air or vapor passage. The magnitude of resistance to vapor passage is dictated by filter element pore size and film strength or surface tension of the liquid. The removal of the separated air/vapor from the filter occurs through floatation facilitated by filter design and predetermined flow pathways created in the filter head. The filter design for this process must consider a bi-directional flow, as liquids are passing in the normal direction while air vapor or bubbles are rising in opposition to or attempting to "float against" the incoming flow of liquid. The clearances between the filter element and the inner wall of the filter must be great enough to allow the flow velocity of the liquid to be reduced to a level well below that of the flotation rate of the bubbles. The top plate of the filter should be formed so as to place the fuel ports in the upper most or raised position in the plate. This will improve the pathway of the bubbles rising to the top of the filter assembly for discharge through the air bleed port. Therefore, the improved design for air-separation or filter cartridges, where the air-fuel separation cartridge has a filter, an external wall and a plenum between the filter and the external wall comprises of the air-fuel separation cartridge having a predetermined design according to the relationship $$(V/CR) < F*D/RR, \tag{1}$$

where V is the volume of the plenum, CR is the peak consumption of throughput rate of fuel, F is a residence factor of at least one, D is the bubble rise distance equal to the height of filter cartridge, and RR is the bubble rise rate. F is more preferably at least two, and most preferably at least three.

Although the cylindrical shape can be utilized with effect if the formula $(V/CR)<F*D/RR$, is followed, a "conical" filter design is preferred. A frustroconical filter design is especially preferred. The cone shape, with the smaller diameter at the top, results in an increased clearance in the upper portion of the filter thus reducing the fuel flow velocity. Preferred embodiments also obey equation (1) for bubble rise rates in the context of all points along the plenum cross section. As the fuel migrates to the lower area of the filter, the filter element diameter becomes larger. The total flow rate, however, does not increase. The throughput flow of the fuel passing through the filter element reduces the velocity. Additionally, the filter most preferably has a nominal filtration diameter ranging from 1 micron to 10 microns which, in contrast to conventional filters, is a broader range of diameters permitted by the conical geometry. The filter is preferably formed as a ribbed conical cylinder having two layers comprising an outer layer of fibrous material and an inner layer of cellulose. The fibrous material is preferably compressed microglass, and filters of this construction demonstrate an improved service life.

Another improvement of the fuel delivery system includes a dividing partition protruding from the base of the filter head into the area of the filter or cavity formed when the filter is attached to the filter head. This partition or wall, protruding from the base of the filter head to the top plate of the filter and extending to the interior wall of the filter, would effectively separate the area between the filter head and the filter top plate into two separate chambers, isolating the ports used for exhausting the unwanted gasses from the incoming flow of liquid and establishing a separate discharge pathway for the unwanted gasses. What was once a common area of turbulence and eddies created by the incoming flow of liquid, is now two separate chambers, an inlet chamber for incoming fluid and an outlet chamber for the collection and discharge of unwanted gasses. The proper positioning of the dividing partition permits communication through a number of ports in the top plate that allow unrestricted flow of the incoming liquid into the filter, while other ports leave sufficient openings for the passage of bubbles to rise into the newly created outlet chamber and be discharged through the air bleed port.

Another improvement involves the area of the filter head surrounding the air bleed port. An air bleed port is formed as a simple hole machined into the filter head. The improvement would consist of forming an inverted cup in the filter head in the area surrounding the air bleed port. The inverted cup should be of sufficient size and shape to aid in the collection and channeling of the bubbles to the air bleed port for discharge.

Yet another aspect includes a non-spilling filter assembly for filtration of fluids. The filter assembly comprises a filter head including an inlet for receiving the fluids to be filtered, an outlet for the fluids to exit the filter head after the fluids have been filtered, a threaded connector for use in coupling the filter head with a filter cartridge when a filter cartridge is attached to the filter head, and a plug of a predetermined volume sufficient to accommodate drainage of the fluids from the filter assembly. A filter cartridge may be threadably attached to the threaded connector. The filter cartridge includes an external wall providing a reservoir volume sufficient to accommodate the plug such that the reservoir is able to contain the predetermined volume of the drainage fluids when the filter cartridge is detached from the threaded connector and the plug is withdrawn from the reservoir. A cap is provided for selective use in sealing the reservoir to retain the predetermined volume of fluid drainage with the reservoir when the filter cartridge is detached from the threaded connector. An optional air-bleed port extends from at least one of the inlet and the outlet in position to facilitate drainage from the non-spilling filter assembly. This air-bleed port has a first end in fluidic communication with a second end, the first end being in fluidic communication with the corresponding one of the inlet and the outlet, and the second end being positioned for sealing engagement with respect to an interior confines of a filter cartridge when the filter cartridge is attached to the threaded connector, such that removal of the filter cartridge from the threaded connector permits the fluidic communication between the first end and the second end to break hydraulic vacuum and facilitate drainage from the corresponding one of the inlet and the outlet.

The non-spill filter assembly may be used by flowing fluid for filtration on a flow pathway between the inlet and the outlet, selectively detaching the filter cartridge from the threaded connector to withdraw the plug from the reservoir, and draining fluids from the inlet and the outlet into the reservoir. The cap may be used to seal the fluids within the reservoir by installing the cap to cover the reservoir. The cap, by way of example, may include a threaded nipple and the sealing of fluids in the reservoir may be accomplished by threading the threaded nipple of the cap into the threaded coupling of the filter cartridge.

The air-fuel filter and the water separator are functioning components of the fuel delivery system. Spin-on fuel filters and water separator filters of various size, design, and materials have become abundantly available. With the availability of "will fit" filters of unknown qualities that could be interchanged, it is impossible to assure high levels of performance. Therefore, it is of great importance that usage of the proper air-fuel filter and the water separator on the present invention be controlled. The ability of the "unique and useful" feature of the non-spill filter, when property used not only eliminates contamination of the environment, but also prevents the use of "will fit" filters on the invention that could negate the important functions of the device.

Another aspect involves the addition of a screen type sock filter on the end of the pickup tube that delivers the fuel from the interior of the filter. This tube extends to the bottom of the filter. The fuel in this area of the filter is more apt to be free of any air-vapor that could have passed through the filter. To further reduce the chance of random bubbles entering the pickup tube and passing on to the engine, the improvement features a wire screen filter or "sock" surrounding the open end of the pickup tube. The screen filter or "sock" is constructed as large as possible yet small enough to fit through the opening in the top of the filter where it attaches to the nipple. The filter "sock" could be constructed of similar screen as used in the water separator. The "sock" forms a barrier to bubbles coming close to the high flow area surrounding the tip of the pickup tube.

Additional details, object, and advantages concerning the aforementioned aspects of the invention will be apparent to those skilled in the art upon reading the following text together with the accompanying drawings.

BRIEF DESCRIPTION OF THE DRAWINGS

FIG. 2 depicts a fuel transfer pump of the type that operates using a G-rotor, where an improvement comprising a U-cut is made in the rotor cavity;

FIG. 3 provides additional detail with respect to the U-cut shown in FIG. 2;

FIG. 4 provides additional detail with respect to the rotor cavity of the transfer pump shown in FIG. 2.

FIG. 5 depicts a prior art design for ball-and-spring check valve assemblies that are useful in air-fuel separation systems of the type shown in FIG. 1;

FIG. 6 depicts an elastomeric valve member that may be substituted for improved functionality with respect to the ball shown in FIG. 5;

FIG. 7 depicts the elastomeric valve member of FIG. 6 in use;

FIG. 12 depicts a dimensional comparison between various commercially available spin-on filters;

FIG. 13 is a continuation of FIG. 12 including flow velocity calculation results for various filter components; and FIG. 14 is a continuation of FIG. 12 including flow velocity calculation results for various filter components.

DETAILED DESCRIPTION OF THE PREFERRED EMBODIMENTS

According to an exemplary embodiment illustrating preferred features of the fuel delivery system, there will now be shown an improved design for air-fuel separation systems where there is provided an electronic heating element for preconditioning of recirculation of fuel prior to air-fuel separation.

Figure 1:
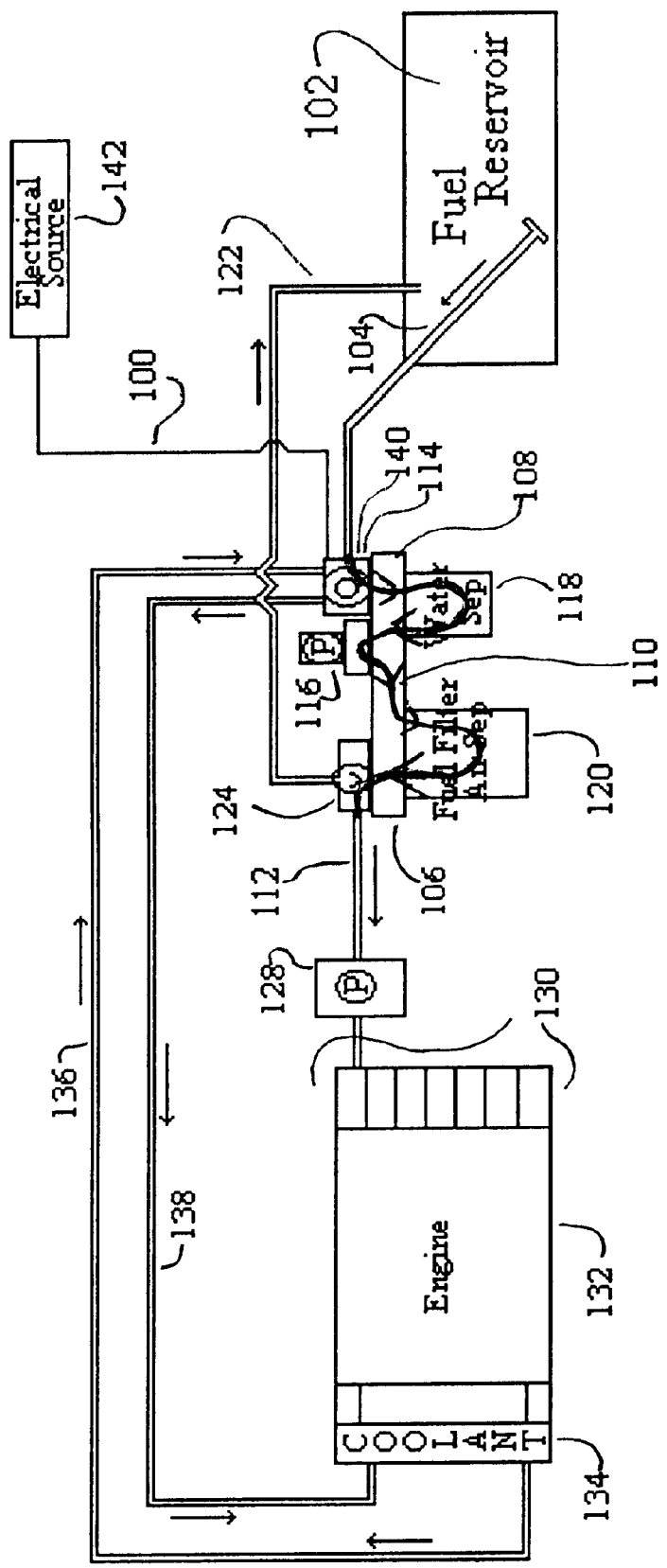
FIG. 1 is a schematic diagram of an air-fuel separation system that includes an electrical heating system for recirculation and preprocessing of fuel.

FIG. 1 is a schematic diagram illustrating, by way of example, the major preferred components of a fuel delivery system 100. An insulated fuel reservoir 102 is coupled with fuel supply line 104 to supply a fuel processing assembly 106, such as the FUEL PREPORATOR® device that is obtainable from Diesel Products, Inc., of St. Louis Mo. The FUEL PREPORATOR® is the best known commercially available device for use and modification according to the principles described herein. Certain models, e.g., the year 2000 model, of the commercial device are preferred for use according to the principles described herein. The FUEL PREPORATOR® device is substantially shown and described in U.S. Pat. No. 5,746,184.

A central block 108 contains internal flow passages and valving that provides an internal flow pathway 110 placing the fuel supply line 104 in communication with a fuel outlet line 112 and submits the fuel for sequential processing at various stations. Flow pathway 110 enters the fuel processing assembly 106 at heater block 114, which heats the fuel to reduce fuel viscosity and prevent gelling in cold climates. Flow is assisted by an electrically actuated transfer pump 116, which maintains a positive gage pressure on the side of fuel outlet line 112. The heated fuel flows to a water separator 118 then to the transfer pump 116 and an air separator 120 before exiting into fuel outlet line 112. Air that is removed from the fuel by the air separator 120 bleeds into air return line 122 for return to the fuel reservoir 102.

A two-way valve 124 in the fuel processing assembly 106 may be selectively opened and closed, e.g., by electrical, manual, or air pressure controls, for recirculation of heated fuel, with fluid contaminates and particulate contaminates removed, in order to improve the overall quality and characteristics of fuel in the fuel delivery system 100.

The fuel outlet line 112 feeds injector pump 128. Injector pump 128 can be any diesel injector pump, such as a mechanical or electronically controlled pump, and it operates according to known principles to feed a plurality of injectors, for example, injectors 130, on a conventional diesel engine 132.

While the engine 132 is running, the engine coolant, e.g., from a radiator 134, is optionally circulated through a coolant feeder hose 136, into the heater block 114, and returned to the radiator 134 through hose 138. This circulation of coolant heats the incoming fuel by heat exchange, in heater block 114. This heating reduces the viscosity of the fuel and consequently, the fuel has a reduced carrying capacity for entrained air.

The fuel delivery system 100 and heater block 114 are improved by the addition of an optional but preferred resistive heating element 140, which is powered by an external electrical source 142. The external heating source 142 may include a bank of automotive batteries, an electrical generator, or a voltage converter. The electrical source 142 may be an alternator for the vehicle and may optionally replace the coolant circulation system through hoses 136 and 138. A voltage converter may, for example, accept 110 volt or 220 volt alternating current and convert the same to 12 volt or 24 volt DC current. This arrangement permits, for example, a trucker to park a truck proximate to an appropriate plug-in and park the truck for an overnight stay under frigid conditions where recirculation of heated fuel through valve 124 facilitates easy starting of the truck after the trucker has rested.

According to another aspect of the fuel delivery system, which is now shown by way of example, the rotor cavity of a G-rotor fuel transfer pump, such as transfer pump 116, may be provided with a cut, such as a U-cut, that prolongs the life of the pump.

FIG. 2 depicts a midsectional view of the transfer pump 116 and provides additional detail with respect to FIG. 1. Transfer pump 116 includes an armature 200 and a field housing 202 that cooperate in a conventional manner to function as an electrical motor spinning shaft 204. A plurality of bolts, e.g. bolts 206 and 208, connect the field housing 202 with a rotor-housing block 205. The shaft 204 is connected to a conventional impeller in the form of "G" rotor 210, which is generally cylindrically shaped with downwardly extending fins that contact fuel 212 for transfer pumping. A journal bearing surface 214 contacts the shaft 204. Packing or an elastomeric seal 216 is present between the shaft 204 and a rotor-housing 205 to prevent leakage of fuel that, otherwise, might create an explosion or fire hazard upon contact with the armature 200 and field housing 202. The seal 216 also prevents fuel seepage into the atmosphere where it could cause contamination or create a different type of explosion or fire hazard.

In normal operation, the commencement of rotation of the G-rotor 210 within cavity 220 causes a relative vacuum as fuel is drawn into the pump, and the seal 216 must stand this pressure differential. Outside air is much less viscous than the fuel and tends to leak more readily through the seal 216 and into the cavity 220. Once fuel begins moving under the influence of G-rotor 210, cavity 220 is pressurized and the packing must withstand the internal pressure. Thus, seal 216 is subjected to pressure cycling from vacuum to overpressure conditions relative to ambient pressure external to the transfer pump 116. This vacuum and repressurization sequence fatigues the seal 216, thereby accelerating its failure.

Pump 116 is in all respects previously mentioned in the context of FIG. 2 a conventional fuel transfer pump, however, pump 116 also contains various improvements to the design of cavity 220 that permit longer pump life and more efficient operation.

FIG. 3 is described in the context of an enlarged portion of FIG. 2 and shows an improvement to the design of cavity 220 that reduces the pressure cycling exposure on seal 216. Cavity 220 has a generally cylindrical shape that is concentric with the shaft 204. An upper divider wall 222 meets a sidewall 224 in rotor housing block 205 to define cavity 220. Shaft 204 penetrates the divider wall 222. A groove in the form of U-cut 226 in divider wall 222 facilitates fluidic communication that relieves pressure-induced strain on the seal 216. U-cut 226 is shaped like a slice of pie pointing towards shaft 204, i.e., the U-cut 226 increases in angular dimension towards the sidewall 224, the sidewall 224 forming a radially outboard wall. The U-cut 226 preferably has a volume that is at least about equal to the volume of the plenum or to the volume in space 228 between the G-rotor 210 and the sidewall 224, and functions as a surge chamber to prevent seal 216 from being exposed to extremes of pressure cycling. The provision of U-cut 226 can significantly extend the service life of seal 216 and is a significant safety enhancement in the intended environment of use.

FIG. 4 depicts a bottom view of the rotor-housing block 205 and provides additional detail with respect to the U-cut 226. A plurality of bolt holes 400, 402, 404, and 406 exist for coupling with the field housing 202 shown in FIG. 2. A central hole 408 is provided for the passage of shaft 204.

Sidewall 224 is circumscribed at its lower extremity by an O-ring groove 410. The U-cut 226 resides in the lower face of wall 222 creating fluidic communication between seal 216 and space 278 of chamber 220 of the assembled pump 116 (see also FIG. 2). The facility for fluidic communication thus provided via the U-cut 226 reduces the intensity and duration of pressure cycling or surge exposure upon seal 216 by facilitating fluid flow for purposes of equalizing temporary pressure imbalances caused by the actuation of the G rotor 210.

According to still further preferred embodiments and instrumentalities of the preferred fuel delivery system, which are now shown by way of example, air-fuel separation systems may be provided with improved check valves that prolong the service life of these systems.

FIG. 5 depicts a prior art spring-biased ball assembly 500 of a type that was shown and described in U.S. Pat. No. 5,746,184. These valves are generally useful as check valves, however, it has been discovered that these valves wear in ways that cause them to eventually leak. A spring 502 urges a ball 504 towards a beveled valve seat 506. Engine vibration and or road vibration as well as repeated opening and closing of the valve assembly 500, eventually causes a groove 508 to wear in the ball proximate face 510 of the valve seat 506. The mere existence of the groove 508 does not by itself cause the valve assembly to leak, but the ball 504 tends to rotate, for example, as shown by arrow 512, upon opening and closing of the valve assembly 500. This rotation orients the groove 510 in misalignment with face 510, and the groove 508 then provides a conduit for leakage when he ball 504 is normally seated against face 510.

The solution to this problem is to provide a check valve assembly that does not have a rotatable seal element. FIG. 6 depicts a valve member 600 that can be used in place of ball 504. Valve member 600 has a cylindrical shaft 602 that is integrally formed with a semi-spherical head 604 to present a shoulder 606. As shown in FIG. 7, the valve member 600 is seated against valve seat 506 in a position where the cylindrical shaft 602 resides within spring 700 and the semispherical head 604 seats against face 510. The bias of spring 700 prevents rotation of valve member 600 off-axis from axis 702.

According to still further aspects of the preferred fuel delivery system, a non-spill filter assembly may be provided including a filter cartridge having a reservoir volume sufficient to catch drainage from the air-fuel separation system. This is accomplished through the use of a plug on the filter head that substantially fills the reservoir when the filter cartridge is installed. The plug is withdrawn when the filter cartridge is removed from the reservoir, which is then sufficiently empty to capture drainage from the air-fuel separator system. This type of filter design is not limited to air-fuel separation systems, and may be adapted for use wherever filter replacement creates a risk of spillage.

Figure 8:
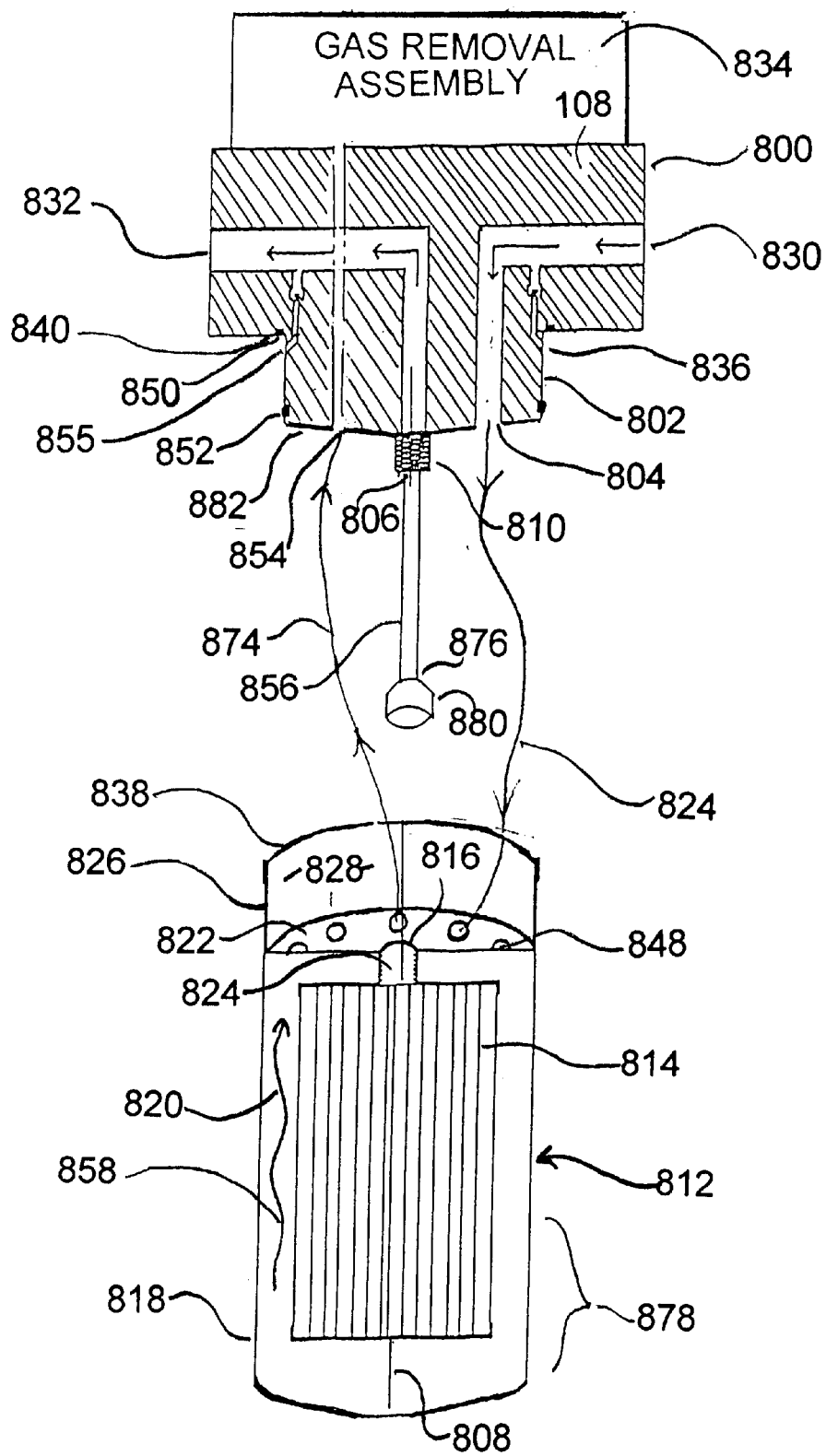
FIG. 8 depicts a spin-on filter assembly including a filter cartridge with a reservoir that may be used to catch drainage from a filter head, and is generally useful in air-fuel separation systems of the type shown in FIG. 1.

FIG. 8 depicts a midsectional view of a spill-proof filter assembly 800 that can be used for any type of filter, such as the air separation filter 118 or the water separation filter 120 shown in FIG. 1. In preferred embodiments, the central block 108 or any other filter-mounting structure, is machined to provide a filter head cylindrical plug 802 having an inlet 804 an outlet 806. The outlet 806 is centrally disposed around an axis of symmetry 808, and a threaded nipple 810 circumscribes the outlet 806.

A renewable filter cartridge 812 includes a conventional filter element 814 circumscribing a central threaded opening 816, which is in fluidic communication with the interior of filter element 814. An exterior wall 818 surrounds the filter element 814 to provide a plenum 820. A top plate 822 supports the threaded opening 816. A plurality of fuel ports such as port 848 permit fluidic communication between outlet 804 and plenum 820.

A portion 826 of exterior wall 818 rises above the top plate 822 to form a reservoir 828, which is mostly filled by plug 802 when the threaded nipple 806 is coupled with the threaded opening 816. When the renewable filter cartridge is unscrewed to disengage the threaded nipple 806 from the threaded opening 816, plug 802 is removed from the reservoir 828, which is then able to catch drainage from the lines 830 and 832 that communicate with inlet 804 and outlet 806. A cap (not depicted in FIG. 8) having less volume than plug 802 may be installed over reservoir 828 to seal the contents therein for eventual filter disposal.

A bleed port 836 is optionally used to purge fluid from the inlet line 830. As shown in FIG. 8, the bleed port is sealed and covered by an elastomeric square ring seal 850 and an elastormeric round ring seal 852, but is positioned in a horizontal section of the line to break a hydraulic vacuum and facilitate drainage once the seal between rim 838 and shoulder 840 is broken. An identical bleed port 855 may optionally be installed in the outlet line 832.

Still yet another aspect of the invention is in the design of the pickup tube 856, which preferably but optionally has solid walls that drop a sufficient distance to place an end opening assembly 876 proximate a lower end 878 of filter element 818 when fully assembled so that the end opening assembly resides within the filter element 814. A screen sock type filter 880 is preferably but optionally mounted on the inlet end opening assembly 876. In the event that air crosses the barrier created by filter element 814, bubbles are thus permitted to rise interior to filter element 814 along the solid walls of pickup tube 856. The screen sock filter 880 forms a second barrier that coalesces entrained air and assists in the overall effort to prevent bubbles from entering the inlet of the pickup tube when the air would be discharged to the engine.

In cases where the filter head plug assembly 800 is used in the air separator 118, it may optionally be provided with perforations leading to a conventional gas removal assembly 834, such as that shown in U.S. Pat. No. 5,746,184. The volume of reservoir 828 may vary by design to accommodate all of the drainage volume that is required to prevent spillage.

As taught in the prior patent U.S. Pat. No. 5,746,184, fuel delivery systems of the type shown as fuel delivery system 100 are capable of improving fuel economy by 6% to 15%. Enhancements to the system as will be described below, show that even greater improvements in fuel economy can be obtained, provided the system components incorporate into their design a number of features that have now been developed.

One such enhancement involves the volume of the plenum 820 that exists between the external filter wall 818 and the filter element 814. In cases where the filter cartridge 812 is intended for use as an air separation filter, the volume of plenum 820 should be sufficient to slow the fuel velocity to a value less than the rise or flotation rate of a bubble in the fuel. In stationary fuel, these bubbles rise at a rate of approximately one foot per second. Thus, $$(V/CR) < F*D/RR, \tag{1}$$

where V is the volume of plenum 820, CR is the peak consumption or throughput rate of fuel, F is a residence factor, D is the bubble rise distance equal to the height of filter cartridge 812, and RR is the bubble rise rate. F is one or greater and is preferably at least two and more preferably at least three.

Still another aspect is in the design of the air discharge port 854. An inverted cup formed in the face 882 of the filter block surrounding the discharge port is preferred. The inverted cup will serve to collect the bubbles to the area of the discharge port. Tests on diesel engines have confirmed that fuel delivery systems incorporating these design parameters are capable of improving fuel economy up to twenty-one percent or more in some engine applications, and opacity in diesel emissions can be cut by twenty-five percent or more. These improvements in terms of reduced opacity can be further reduced by using the system thus described in combination with particulate traps or catalytic converters. These tests have further shown decreases in carbon monoxide emissions from thirty to forty-two percent, and decreases in oxides of nitrogen ranging from 4% to 11%.

FIG. 8 depicts filter assembly 818 with top plate 822 having a plurality of fluid ports such as 848 and the like, wall 826, and reservoir 828. When the assembly 800 is assembled and in operation, fluid from inlet 804 follows pathway 824 filling chamber 828 then flowing through ports, such as port 848, and into plenum 820. Fluid then flows through filter element 814 leaving separated bubbles in plenum 820. Bubbles, having been separated by filter element 814, rise along pathway 858 towards upper plate 822. The bubbles must then pass through a plurality of ports, such as 848, against an opposing flow of incoming fluid from port 804 into chamber 828. The rising bubbles are discharged through air bleed discharge port 854 and into return line 122 (see also FIG. 1). When the opposing flow of fluid through ports such as 848 and the like is at a velocity greater than the float rise rate of the bubbles, the flow creates a barrier to the rising bubbles preventing their discharge.

The solution to this problem is to divide the chamber 828 into two chambers, an inlet chamber for the incoming flow of liquid and an outlet chamber for the collection and discharge of entrained air bubbles. According to still further aspects of the preferred fuel delivery system, air-fuel separation systems may be provided with a filter head with a dividing partition protruding from the base, that separates what was once a common fuel inlet chamber into two separate chambers, an inlet chamber for incoming fluid and an outlet chamber for the collection and discharge of unwanted gasses.

Figure 9:
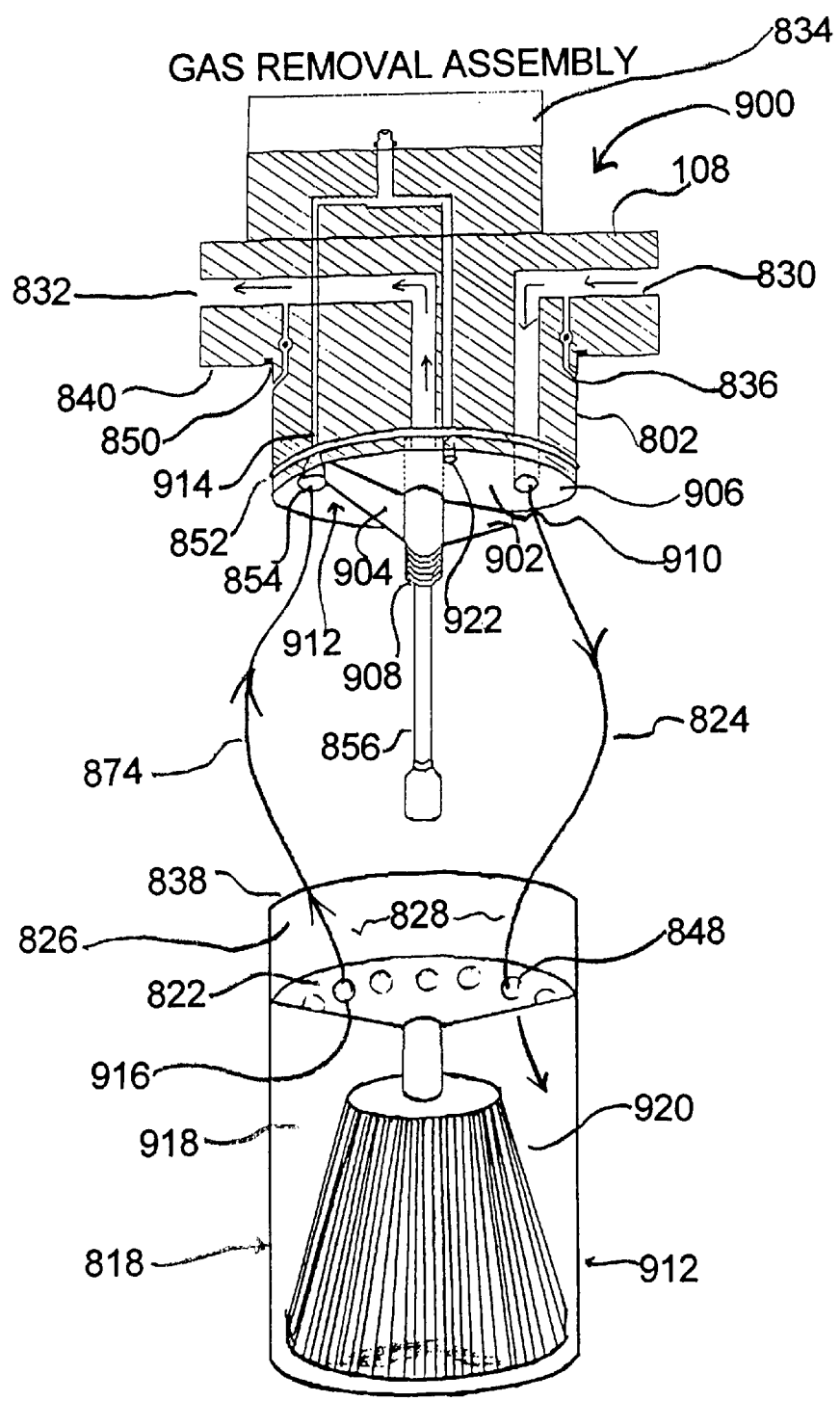
FIG. 9 depicts a spin-on filter assembly including a filter cartridge with a divider wall or partition extending from the filter head to separate the common chamber between a filter head and filter into two chambers, an inlet chamber for the incoming fluid and an outlet chamber for the collection and discharge of unwanted gasses, and is generally useful in air-fuel separation systems of the type shown in FIG. 1.

FIG. 9 depicts a mid sectional view of a filter assembly 900 that can be used in place of filter head assembly 800. In describing FIG. 9, like numbering has been retained for identical elements that have already been described in the context of FIG. 8. In summary of this aspect of the preferred embodiments, the central block 108 (see FIG. 1) or any other filter-mounting structure, is machined, cast, molded or formed to have a dividing walls 902 and 904 protruding from the face 906. The walls 902 and 904 extend a predetermined length from face 906 and outward a predetermined width from a threaded nipple 908 to establish a sealing engagement with upper plate 822. Filter 818 is assembled to block 108 by threaded engagement with nipple 908. The walls 902 and 904 will combine with wall 826 and plate 822 to divide chamber 828 into two sections. Thus, an inlet section 910 is formed in communication with inlet ports such as 848 and the like, as well as fuel inlet line 830. Similarly, a discharge section 912 is formed communicating gas bleed line 914 with gas outlet ports, such as port 916. The dividing walls 902 and 904 can be positioned to allow any number of ports, such as ports 848 and 916 and the like, to be in fluidic communication with their corresponding sections 910 and 912, respectively. Thus, the separate sections 910 and 912 allow unrestricted fluid passage to plenum 918 while essentially eliminating turbulence and other flow conditions that, otherwise, would tend to retain bubbles in the system. Air bubbles having been separated by filter 920 gathering in plenum 918 can now pass unrestrictedly through ports 916 and the like to collect in outlet section 912 for discharge into air bleed line 914. A second air bleed line 922 is optionally in communication within inlet section 910 to remove entrained air that happens to rise into inlet section 910, thus preventing the formation of a possible air lock in the inlet section 910.

Another aspect shown in FIG. 9 is in the design of the cone shaped filter element 920, as compared to the cylindrical filter element 814 shown in FIG. 8. A cone shaped element is preferred with the smaller diameter at the top to increase the volume of plenum 918 as compared to plenum 820 shown in FIG. 8. Also, a ribbed sheet material is preferred having a central core of cellulose fiber or cellulose-microglass blend is preferred, with an outer layer of compressed microglass. The core has a tighter pore size or nominal diameter that preferably ranges from 1 micron to ten microns. In a preferred embodiment, the core has a nominal diameter of from 3 microns to 5 microns. These sizes have been found to be most useful in separating entrained air from fuel without premature plugging from particulates in the fuel. The nominal diameter of the outer microglass layer is preferably at least 20 microns and serves several functions. One function is to remove larger particulates that are held away from the inner core. Another function is to provide a fibrous substrate to coalesce smaller bubbles into larger bubbles that eventually break surface tension and float free.

Figure 10:
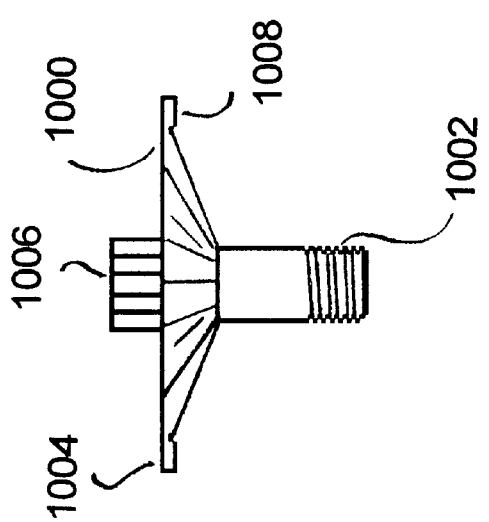
FIG. 10 depicts a cap that may be used in combination with the filter cartridge shown in FIG. 8 to capture or retain a volume of fluid drainage within the reservoir.

FIG. 10 depicts a cap 1000 having a central threaded nipple 1002 and an elastomeric disk 1004. The threaded nipple 1002 has a knurled cap 1006 that may be used to turn cap 1000 for purposes of engaging and disengaging cap 1000 from filter cartridge 812. The threaded nipple 1002 extends downwardly a sufficient distance to permit coupling with the Threaded opening 816 (see FIG. 8) of the filter cartridge 812. The elastomeric disk 1004 presents a sealing surface 1008, which engages portion 826 of wall 818 to seal the contents of reservoir 828 and filter cartridge 812 for eventual disposal. For example, diesel fuel or engine oil may be sealed in this manner for eventual recycling, and organic vapors are prevented from escaping into the atmosphere.

Figure 11:
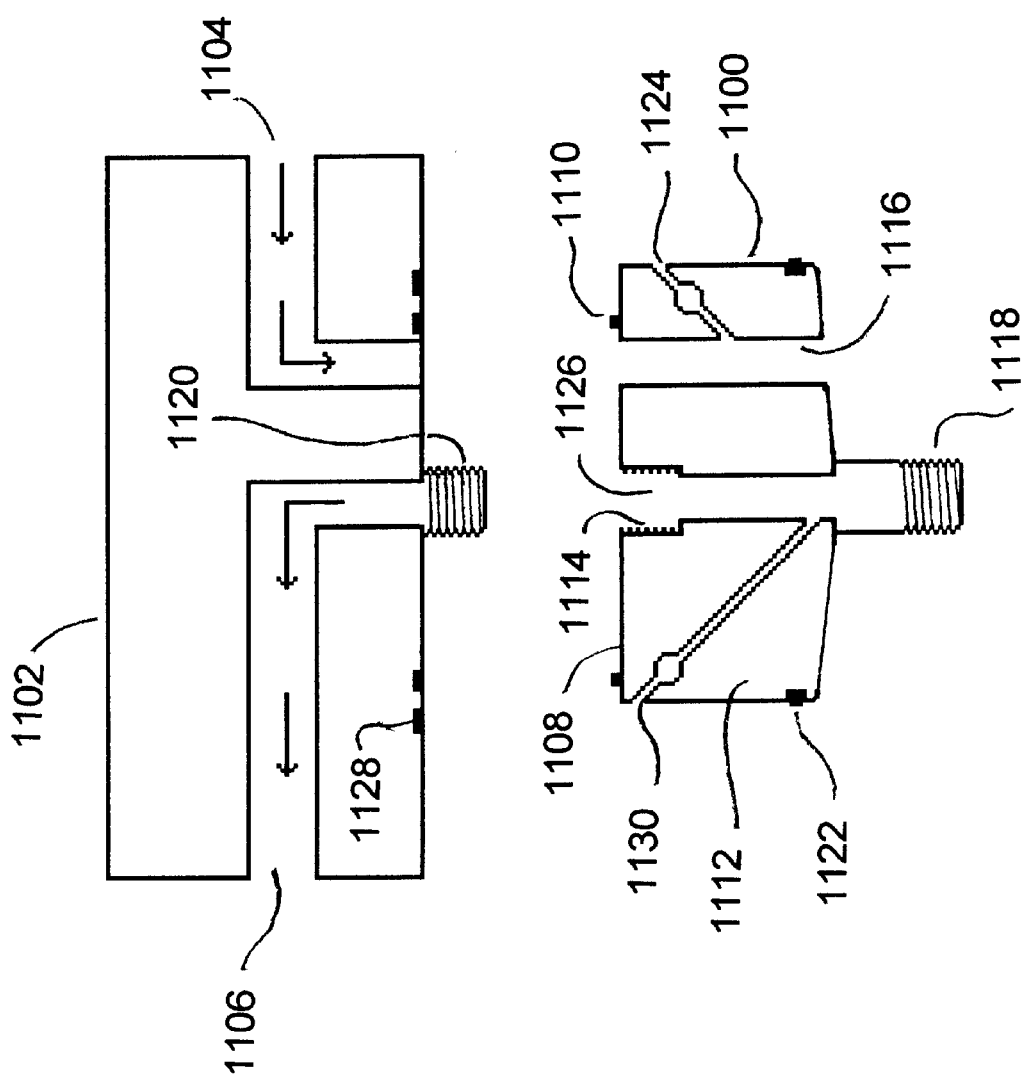
FIG. 11 depicts a plug body that may be installed as a retrofit assembly onto a conventional filter head for use with filter cartridges in the manner shown in FIG. 8.

FIG. 11 depicts a retrofit adaptor 1100 for use in adapting a conventional filter head to be used in combination with non-spill filter cartridges like filter cartridge 812. The conventional filter head includes a conventional inlet 1104 and an outlet 1106 with a threaded male nipple 1120. The retrofit adaptor 1100 includes a mating surface 1108, which is circumscribed by a bonded washer or O-ring 1110. A plug body 1112 has the same general shape as does plug 802 (see FIG. 8). A central threaded female opening 1114 is configured for mating engagement with the threaded male nipple 1120. An inlet port 1116 is positioned to be in alignment with inlet 1104 when the adaptor 1100 is fully mated with the conventional filter head 1102. A second threaded male nipple 1118 provides the same functionality as does nipple 810.

An air bleed port 1124 may optionally be used to purge air from the inlet line 1104. The air bleed port is provided with an elastomeric square ring seal 1128 and an elastomeric round ring seal 1122, but is positioned in a section of the line to break a hydraulic vacuum and facilitate drainage once the seal between square ring seal 1128 and round ring seal 1122 is broken. The seals 1122 and 1128 provide the same functionality as do seals 850 and 852 shown in FIG. 8. An identical air bleed port 1130 may optionally be installed in the outlet line 1126. The retrofit adapter 1100 may optionally be provided with wing structures (not shown in FIG. 11) identical to walls 902 and 904 for use in adapting a conventional filter head to be used in combination with a system like that shown in FIG. 9.

In operation, the filter cartridge 812 is screwed onto the corresponding nipple 810 or 1118, and fluid is pumped through an inlet, such as inlet 830 or 1102. The filter continues to operate normally until such time as it requires renewal. The filter cartridge 812 is then unscrewed to detach it from the corresponding nipple 810 or 1118, which removes the plug 802 or plug body 1112 from reservoir 828. The detached filter is retained in position until such time as drainage ceases into reservoir 828. Any fluids draining from the respective filter heads are captured in the reservoir 828. Cap 1000 is then placed into position covering the reservoir 828 and rotated to form a seal. The filter cartridge 812, along with its contents, is then handled for proper disposal.

EXAMPLE 1

Air Separation Test

Tests were conducted on four (4) commercially available fuel filters to determine the level of air separation qualities under various flow conditions and the feasibility of using these filters on an air separation device such as the FUEL PREPORATOR®. The filters were tested on a comparative basis to establish their relative effectiveness under conditions of normal flow and to establish flow limitations that might be attributed to a particular filter design. A similar test was conducted on the FUEL PREPORATOR® with the Fleetguard's model FP-805 filter. The results of these tests were to be compared with the data obtained from similar tests performed on the newly designed air separation device with the improved and enhanced features of the fuel delivery system.

Filters tested were the Fleetguard; FF-104, FF-105, FF-211, FS-1000, and FP805. The FUEL PREPORATOR®, as sold by the factory, comes equipped with the FP-805.

FIG. 12 lists the dimensions and features of the filters with reference to a drawing that illustrates the locations of various measurements, which are described as measurements A–J. FIG. 13 is a continuation of FIG. 12 that categorizes the respective filters under test by calculating a flow velocity in feet per second across various areas corresponding to measurements A (fuel inlet holes), B (area above filter upper or top plate), and C (plenum between filter element and outer wall). FIG. 14 lists various input velocities and the flow velocity of the liquid as it passes through crucial areas of the filters corresponding to measurements A, B, and C.

The air separation test stand manufactured for the test had the same basic features as the FUEL PREPORATOR®. The fuel transfer pump, however, was modified to include a high volume pump powered by a variable speed motor to permit testing to be done at various flow rates. The air bleed port was equipped with interchangeable fittings of three different size diameters, 0.040", 0.060", and 0.070". The air bleed port and the regulator bypass or return to tank lines were separated to allow the monitoring of each flow individually. All lines to and from the test stand were transparent and setup with proper lighting for best optics for monitoring of air passage, etc. Air was induced into the system through a needle valve located upstream of the transfer pump. The filtered fuel was monitored visually to ascertain the effectiveness of air removal by the presence or absence of foam and bubbles.

As shown in Table 1 for FF-104, air separation and discharge is effective up to a 30 GPH flow rate with the air bleed discharge port at either the 0.060" and 0.070" diameter. As flow rates near 42/45 GPH bubbles begin passing through the filter. As the flow rate reaches 54 GPH and beyond, air carried by the flow, passes readily through the filter. Table 2 for FF-105 shows that the air separation qualities of the FF-105 are virtually identical to those of the FF-104.

Table 3 for FF-211, shows that air separation and discharge is efficient up to about 55/60 GPH. Beyond that rate, the air bubbles pass readily through the filter media.

Table 4 for FS-1000 shows that air separation and discharge is efficient up to 30 GPH flow rate with the air bleed discharge port at either the 0.060" and 0.070" diameter. As flow rates near 42/45 GPH bubbles begin passing through the filter. As the flow rate reaches 54 GPH and beyond, air carried by the flow, passes readily through the filter.

Table 5 for FP-805 demonstrates that the factory air separation system utilizing the FP-805 filter separates and discharges air/vapor very well as it is currently manufactured—at least up to the design flow rating of approximately 100 GPH. The interior design clearances of the filter however, limit the maximum flow rate for the system, as it is utilizing a single FP-805 filter, to approximately 165 GPM. Air/vapor bubbles begin passing through the system at this flow rate. At the 225 GPH flow, the passage of air/vapor through the filter and system is massive.

EXAMPLE 2

New Filter Construction

The flow tests of Example 1 were repeated for a new filter construction. A filter was constructed having a cylindrical element as shown in FIG. 8 using the same media and approximate Sq. In. surface area as the FS-1000 and the FP-805. The interior design of the filter was modified according to Equation (1) where F=3. As shown in Table 6, the capacity for separation of air/vapor greatly exceeds that of the commercial device which is now marketed as the FUEL PREPORATOR®. Pump limits of the test stand limited the peak consumption or throughput flow rate to 405 GPH. The modified filter effectively separates virtually all air/vapor from the liquid at this flow rate. Referencing data from Table 6, the modified design separates virtually all air/vapor from the liquid at up to approximately 600 GPH, i.e., it is effective at more than three (3) times the volumetric flow rate of prior filters in use for this purpose.

The separation of air/vapor from a liquid is a function of the filter design and is caused by the phenomenon of wetted porous papers resistance to air or vapor passage. The magnitude of resistance to vapor passage is dictated by the pore size of the paper and by the film strength or surface tension of the liquid and is therefore in the hands of the designer. The removal or discharge of the separated bubbles from the filter require the interior design of the filter to be such as to reduce the internal flow of the liquid to a rate that allows the bubbles, through natural buoyancy, to rise to the top of the assembly. At this point the bubbles can then enter the air bleed discharge hole.

The media used in the FF-104, 105, and 211 filters is a 20/25 micron cellulose fiber. Prior testing (see Cummins Engine Company, Service Topic 5-135) confirms that the wetted element of the FF-104 and the FF-105, under static conditions, will support a pressure of ten inches of water before passage of bubbles takes place. Filter media tested of lesser quality will support a pressure of only seven inches of water. Under dynamic flow conditions, lower pressures cause breakthrough. The media used in the FS-1000, the FP-805, and the filter tested with the results shown in Table 6 are constructed with the 10 micron Strata-pore™ element.

The revised filter design in accord with the principles of Equation (1) permits the design of filters having a much smaller footprint than the filters which are presently in place. The surface area of the filter element can be reduced in direct proportion to the improvements in flow rates where for example, 667 square inches of surface area in FP 805 yielding a maximum effective flow rate of 165 GPH may be reduced to approximately 271 square inches by the relationship $$667/X = 405/165 \tag{2}$$

Those skilled in the art will understand that the preferred embodiments described above may be subjected to apparent modifications without departing from the true scope and spirit of the invention.

TABLE 1

| | Air Bleed Port Size | | Flow Rate GPH | 30 | 54 | 105 | 165 | 225 | 285 | 345 | 405 |
|---|---|---|---|---|---|---|---|---|---|---|---|
| FF-104 | | | Flow Rate GPM | 0.5 | 0.9 | 1.75 | 2.75 | 3.75 | 4.75 | 5.75 | 6.75 |
| Fuel Ports in | 0.040" | | | | | | | | | | |
| Top Plate, ¼" | | | PSI in Filter | 5 | 5 | 3 | 5.5 | 9 | NA | NA | NA |
| | | | PSI to Engine | 4 | 4 | 2 | 4.5 | 7 | NA | NA | NA |
| | | | Air in return line | Foam | Foam | Foam | Foam | Foam | NA | NA | NA |
| | | | Air Passing System | Traces | Steady Bubbles | Majority | Majority | Majority | NA | NA | NA |
| Air Bleed Flow Rate @ 5 PSI 0.083 GPM | | | | | | | | | | | |
| | 0.060" | | | | | | | | | | |
| | | | PSI in Filter | 5 | 3 | 5 | 5.25 | 9 | NA | NA | NA |
| | | | PSI to Engine | 4 | 2 | 4 | 4 | 7 | NA | NA | NA |
| | | | Air in return line | All | Foam | 0 | 0 | 0 | NA | NA | NA |
| | | | Air Passing System | None-OK | Steady Bubbles | All | All | All | NA | NA | NA |
| Air Bleed Flow Rate @ 5 PSI 0.19 GPM | | | | | | | | | | | |
| | 0.070" | | PSI in Filter | 5 | 5 | 5 | 5.7 | 8.9 | NA | NA | NA |
| | | | PSI to Engine | 4 | 4 | 3.9 | 4.5 | 7 | NA | NA | NA |
| | | | Air in return line | All | Foam | Foam | Foam | Foam | NA | NA | NA |
| | | | Air Passing System | None-OK | Steady Bubbles | 50/50 | 50/50 | 50/50 | NA | NA | NA |
| Air Bleed Flow Rate @ 5 PSI 0.2 GPM | | | | | | | | | | | |
| | | | | | | FLOW | VELOCITY | Ft/Sec | | | |
| A'...Fuel Inlet Holes (Filter Top Plate) Clearance | | | | 0.408 | 0.735 | 1.429 | 2.25 | 3.065 | 3.88 | 4.7 | 5.517 |
| B'...Filter Cap to Top Plate Clearance | | | | 0.147 | 0.264 | 0.515 | 0.809 | 1.103 | 1.398 | 1.692 | 1.986 |
| C'...Filter Cap to Filter Can Inner Call Clearance | | | | 0.229 | 0.413 | 0.803 | 1.262 | 1.721 | 2.18 | 2.639 | 3.098 |

AIR SEPARATION TEST RESULTS
FLEETGUARD FF-104

TABLE 2

| | Air Bleed Port Size | | Flow Rate GPH | 30 | 54 | 105 | 165 | 225 | 285 | 345 | 405 |
|---|---|---|---|---|---|---|---|---|---|---|---|
| FF-104 | | | Flow Rate GPM | 0.5 | 0.9 | 1.75 | 2.75 | 3.75 | 4.75 | 5.75 | 6.75 |
| Fuel Ports in | 0.040" | | | | | | | | | | |
| Top Plate, ¼" | | | PSI in Filter | 5 | 5 | 5 | 5.5 | 9 | NA | NA | NA |
| | | | PSI to Engine | 4 | 4 | 4 | 4.5 | 7 | NA | NA | NA |
| | | | Air in return line | Foam | Foam | Foam | Foam | Foam | NA | NA | NA |
| | | | Air Passing System | Traces | Steady | Majority | Majority | Majority | NA | NA | NA |
| Air Bleed Flow Rate @ 5 PSI 0.083 GPM | | | | | | | | | | | |
| | 0.060" | | | | | | | | | | |
| | | | PSI in Filter | 5 | 5 | 5 | 6 | 8.9 | NA | NA | NA |
| | | | PSI to Engine | 4 | 4 | 4 | 4.8 | 7 | NA | NA | NA |
| | | | Air in return line | Foam | Foam | Traces | Traces | Traces | NA | NA | NA |
| | | | Air Passing System | None-OK | Steady | Majority | Majority | Majority | NA | NA | NA |
| Air Bleed Flow Rate @ 5 PSI | | | | | | | | | | | |

TABLE 2-continued

| | | | | | | | | | | |
|---|---|---|---|---|---|---|---|---|---|---|
| 0.19 GPM | | | | | | | | | | |
| | 0.070" | | | | | | | | | |
| | | PSI in Filter | 5 | 5 | 5 | 5.1 | 8.6 | NA | NA | NA |
| | | PSI to Engine | 4 | 4 | 4 | 4 | 7 | NA | NA | NA |
| | | Air in return line | Foam | Foam | Foam | Foam | Foam | NA | NA | NA |
| | | Air Passing System | None-OK | Steady | Majority | Majority | Majority | NA | NA | NA |
| Air Bleed Flow Rate @ 5 PSI 0.2 GPM | | | | | | | | | | |

| | | | FLOW | VELOCITY | FT/SEC | | | | |
|---|---|---|---|---|---|---|---|---|---|
| A'...Fuel Inlet Holes (Filter Top Plate) Clearance | | 0.408 | 0.735 | 1.429 | 2.25 | 3.065 | NA | NA | NA |
| B'...Filter Cap to Top Plate Clearance | | 0.147 | 0.264 | 0.515 | 0.809 | 1.103 | NA | NA | NA |
| C'...Filter Cap to Filter Can Inner Wall Clearance | | 0.229 | 0.413 | 0.803 | 1.262 | 1.721 | NA | NA | NA |

AIR SEPARATION TEST
RESULTS
FLEETGUARD FF-105

TABLE 3

| | Air Bleed Port Size | Flow Rate GPH | 30 | 54 | 105 | 165 | 225 | 285 | 345 | 405 |
|---|---|---|---|---|---|---|---|---|---|---|
| | | Flow Rate GPM | 0.5 | 0.9 | 1.75 | 2.75 | 3.75 | 4.75 | 5.75 | 6.75 |
| FF-211 Fuel Ports in Top Plate, ¼" | 0.040" | | | | | | | | | |
| | | PSI in Filter | 5 | 5 | 5 | 5 | NA | NA | NA | NA |
| | | PSI to Engine | 4 | 4.1 | 4 | 3.7 | NA | NA | NA | NA |
| | | Air in return line | Foam | Foam | Foam | Foam | NA | NA | NA | NA |
| | | Air Passing System | Traces | Bursts | Majority | Majority | NA | NA | NA | NA |
| Air Bleed Flow Rate @ 5 PSI 0.083 GPM | | | | | | | | | | |
| | 0.060" | | | | | | | | | |
| | | PSI in Filter | 5 | 5 | 5 | 5 | 5 | 5 | NA | NA |
| | | PSI to Engine | 4 | 4.1 | 4 | 4 | 3.2 | 2.9 | NA | NA |
| | | Air in return line | Foam | Foam | Foam | Foam | Foam | Foam | NA | NA |
| | | Air Passing System | None-OK | Bursts | Majority | Majority | Majority | Majority | NA | NA |
| Air Bleed Flow Rate @ 5 PSI 0.19 GPM | | | | | | | | | | |
| | 0.070" | PSI in Filter | 5 | 5 | 5 | 5 | 5 | NA | NA | NA |
| | | PSI to Engine | 4 | 3.9 | 3.8 | 3.8 | 3.8 | NA | NA | NA |
| | | Air in return line | Foam | Foam | Foam | Foam | Foam | NA | NA | NA |
| | | Air Passing System | None-OK | Traces | Majority | Majority | Majority | NA | NA | NA |
| Air Bleed Flow Rate @ 5 PSI 0.2 GPM | | | | | | | | | | |

| | | | FLOW | VELOCITY | FT/SEC | | | | |
|---|---|---|---|---|---|---|---|---|---|
| A'...Fuel Inlet Holes (Filter Top Plate) Clearance | | 0.408 | 0.735 | 1.429 | 2.25 | 3.065 | 3.88 | 4.7 | 5.517 |
| B'...Filter Cap to Top Plate Clearance | | 0.107 | 0.192 | 0.374 | 0.588 | 0.802 | 1.015 | 1.229 | 1.443 |
| C'...Filter Cap to Filter Can Inner Wall Clearance | | 0.099 | 0.179 | 0.348 | 0.548 | 0.747 | 0.946 | 1.145 | 1.345 |

AIR SEPARATION TEST RESULTS
FLEETGUARD FF-211

TABLE 4

| | Air Bleed Port Size | Flow Rate GPH | 30 | 54 | 105 | 165 | 225 | 285 | 345 | 405 |
|---|---|---|---|---|---|---|---|---|---|---|
| | | Flow Rate GPM | 0.5 | 0.9 | 1.75 | 2.75 | 3.75 | 4.75 | 5.75 | 6.75 |
| FS-1000 Fuel Ports in Top Plate, ¼" | 0.040" | | | | | | | | | |
| | | PSI in Filter | 5 | 5 | 7 | 4.5 | 6 | NA | NA | NA |
| | | PSI to Engine | 4 | 4 | 5.9 | 2.75 | 4 | NA | NA | NA |

TABLE 4-continued

|  |  |  |  |  |  |  |  |  |  |  |
|---|---|---|---|---|---|---|---|---|---|---|
|  |  | Air in return line | Foam | Foam | Foam | Foam | Foam | NA | NA | NA |
|  |  | Air Passing System | Traces | Steady | Majority | Majority | Majority | NA | NA | NA |
| Air Bleed Flow Rate @ 5 PSI 0.083 GPM |  |  |  |  |  |  |  |  |  |  |
|  | 0.060" |  |  |  |  |  |  |  |  |  |
|  |  | PSI in Filter | 5 | 5 | 7 | 7 | 9 | NA | NA | NA |
|  |  | PSI to Engine | 4 | 4 | 5.9 | 5.3 | 6.8 | NA | NA | NA |
|  |  | Air in return line | All | Foam | Foam | Foam | Foam | NA | NA | NA |
|  |  | Air Passing System | None-OK | Steady | Majority | Majority | Majority | NA | NA | NA |
| Air Bleed Flow Rate @ 5 PSI 0.19 GPM |  |  |  |  |  |  |  |  |  |  |
|  | 0.070" |  |  |  |  |  |  |  |  |  |
|  |  | PSI in Filter | 4.1 | 4.5 | 5 | 5 | 5 | NA | NA | NA |
|  |  | PSI to Engine | 3.2 | 3.5 | 3.5 | 3.1 | 2.6 | NA | NA | NA |
|  |  | Air in return line | Foam | Foam | Foam | Foam | Foam | NA | NA | NA |
|  |  | Air Passing System | None-OK | Steady | Majority | Majority | Majority | NA | NA | NA |
| Air Bleed Flow Rate @ 5 PSI 0.2 GPM |  |  |  |  |  |  |  |  |  |  |
|  |  |  |  |  | FLOW | VELOCITY | FT/SEC |  |  |  |
| A'...Fuel Inlet Holes (Filter Top Plate) Clearance |  |  | 0.408 | 0.735 | 1.429 | 2.25 | 3.065 | 3.88 | 4.7 | 5.517 |
| B'...Filter Cap to Top Plate Clearance |  |  | 0.078 | 0.14 | 0.272 | 0.428 | 0.584 | 0.739 | 0.895 | 1.051 |
| C'...Filter Cap to Filter Can Inner Wall Clearance |  |  | 0.229 | 0.413 | 0.803 | 1.262 | 1.721 | 2.18 | 2.639 | 3.098 |

AIR SEPARATION TEST RESULTS
FLEETGUARD FS-1000

TABLE 5

FUEL PREPORATOR W/FP-805 FILTER

| Air Bleed Port Size 0.060" |  |  |  |  |  |  |  |  |  |
|---|---|---|---|---|---|---|---|---|---|
|  | Flow Rate GPH | 30 | 54 | 105 | 165 | 225 | 285 | 345 | 405 |
|  | Flow Rate GPM | 0.5 | 0.9 | 1.75 | 2.75 | 3.75 | 4.75 | 5.75 | 6.75 |
| Fuel Ports in Top Plate 0.5" | PSI in Filter | 6 | 6 | 6 | 6.3 | 6.7 | 7.2 | 7.8 | 7.9 |
|  | PSI to Engine | 5 | 5 | 5 | 5 | 5 | 5 | 5 | 5 |
|  | Air in return line | Foam | Foam | Foam | Heavy Foam | Heavy Foam | Heavy Foam | Heavy Foam |  |
|  | Air Passing System | None | None | None | TRACES | STEADY WITH BURSTS | STEADY CONSISTENT | STEADY CONSISTENT |  |
| Air Bleed Flow Rate @ 5 PSI 0.083 GPM |  |  |  |  |  |  |  |  |  |
|  |  |  |  | FLOW | VELOCITY | FT/SEC |  |  |  |
| A'...Fuel Inlet Holes (Filter Top Plate) Clearance |  | 0.068 | 0.123 | 0.238 | 0.374 | 0.51 | 0.647 | 0.783 | 0.919 |
| B'...Filter Cap to Top Plate Clearance |  | 0.023 | 0.04 | 0.079 | 0.125 | 0.17 | 0.215 | 0.261 | 0.306 |
| C'...Filter Cap to Filter Can Inner Wall Clearance |  | 0.049 | 0.089 | 0.173 | 0.272 | 0.371 | 0.47 | 0.569 | 0.668 |

AIR SEPARATION TEST
FUEL PREPORATOR
FP-805 FILTER

TABLE 6

FILTER HEAD FOR TEST - MODIFIED WITH INLET AND OUTLET CHAMBERS AS DEPICTED IN FIG. 9.
FILTER USED FOR TEST - FP-805 MODIFIED TO NEW PATENT DESIGN AS DEPICTED IN FIG. 9.

| | | | | | | | | | | | |
|---|---|---|---|---|---|---|---|---|---|---|---|
| Fuel Ports in Top Plate 0.5" | Air Bleed Port Size 0.060" | Flow Rate GPH | 105 | 165 | 225 | 285 | 345 | 405 | 600 | 720 | 900 |
| | | Flow Rate GPM | 1.75 | 2.75 | 3.75 | 4.75 | 5.75 | 6.75 | 10 | 12 | 15 |
| | | PSI in Filter | 6 | 6.3 | 6.5 | 6.9 | 7.1 | 7.5 | No Data | No Data | Estab |
| | | PSI to Engine | 5 | 5 | 5 | 5 | 5 | 5 | No Data | No Data | Estab |
| | | Air in return line | All | All | All | All | All | All | No Data | No Data | Estab |
| | | Air Passing System | ZERO | ZERO | ZERO | ZERO | ZERO | ZERO | No Data | No Data | Estab |
| Air Bleed Flow Rate @ 5 PSI 0.083 GPM | | | | | | | | | | | |
| | | | | | FLOW | VELOCITY | FT/SEC | | | | |
| A'...Fuel Inlet Holes (Filter Top Plate) Clearance | | | NA | NA | NA | NA | NA | NA | NA | NA | NA |
| B'...Filter Cap to Top Plate Clearance | | | 0.058 | 0.092 | 0.126 | 0.16 | 0.193 | 0.227 | 0.337 | 0.404 | 0.505 |
| C'...Filter Cap to Filter Can Inner Wall Clearance | | | 0.051 | 0.08 | 0.109 | 0.138 | 0.167 | 0.197 | 0.292 | 0.35 | 0.438 |

AIR SEPARATION TEST
MODIFIED FILTER DESIGN

What is claimed is:

1. In an air-fuel separation cartridge having a filter, an external wall and a plenum between the filter and the external wall, the improvement comprising:
   the air-fuel separation cartridge having a predetermined design according to the-relationship $(V/CR) < F*D/RR$ where V is the volume of the plenum, CR is the peak consumption or throughput rate of fuel, F is a residence factor of at least one, D is the bubble rise distance equal to the height of filter cartridge, and RR is the bubble rise rate.

2. The air-fuel separation cartridge of claim 1, wherein F is at least two.

3. The air-fuel separation cartridge of claim 1, wherein F is at least three.

4. The air-fuel separation cartridge of claim 1, wherein the filter has a nominal filtration diameter ranging from 1 micron to 10 microns.

5. The air-fuel separation cartridge of claim 1, wherein the filter has an outer layer of fibrous material and an inner layer of cellulose.

6. The air-fuel cartridge of claim 5, wherein the fibrous material is compressed microglass.

7. A non-spilling filter assembly for filtration of fluids comprising:
   a filter head including:
      an inlet for receiving the fluids to be filtered,
      an outlet for the fluids to exit the filter head after the fluids have been filtered,
      a threaded connector for use in coupling the filter head with a filter cartridge when a filter cartridge is attached to the filter head, and a plug of a predetermined volume sufficient to accommodate drainage of the fluids from the filter assembly.

8. The non-spilling filter assembly of claim 7, further including a filter cartridge threadably attached to the threaded connector.

9. The non-spilling filter assembly of claim 8, wherein the filter cartridge includes an external wall providing a reservoir volume sufficient to accommodate the plug such that the reservoir is able to contain the predetermined volume of drainage fluids when the filter cartridge is detached from the threaded connector and the plug is withdrawn from the reservoir.

10. The non-spilling filter assembly of claim 7 including a cap for selective use in sealing the reservoir to retain the predetermined volume of fluid drainage within the reservoir when the filter cartridge is detached from the threaded connector.

11. The non-spilling filter assembly of claim 7 including a bleed port extending from at least one of the inlet and the outlet in position to facilitate drainage from the non-spilling filter assembly.

12. The non-spilling filter assembly of claim 11, wherein the bleed port has a first end in fluidic communication with a second end, the first end being in fluidic communication with the corresponding one of the inlet and the outlet, and the second end being positioned for sealing engagement with respect to an interior confines of a filter cartridge when the filter cartridge is attached to the threaded connector, such that removal of the filter cartridge from the threaded connector permits the fluidic communication between the first end and the second end to break hydraulic vacuum and facilitate drainage from the corresponding one of the inlet and the outlet.

13. The non-spilling filter assembly of claim 7, wherein the plug is a plug body configured as a retrofit adaptor for a conventional filter head.

14. A non-spilling spin-on filter cartridge comprising:
an external wall circumscribing a filter to provide a plenum between the external wall and the filter;
a perforated wall crossing the external wall to define a reservoir having a predetermined volume sufficient to accommodate fluid drainage from a corresponding filtration system during renewal of the spin-on filter in the intended environment of use; and
a threaded coupling mounted in the perforated wall to provide a flow pathway from the filter,
the perforated wall providing a structural support for retaining the filter in place;
wherein the non-spilling spin-on filter is configured as an air-fuel separation cartridge having a predetermined design according to the relationship $$(V/CR) < F*D/RR,$$

where V is the volume of the plenum, CR is the peak consumption of throughput rate of fuel, F is a residence factor of at least one, D is the bubble rise distance equal to the height of the filter, and RR is the bubble rise rate.

15. The non-spilling spin-on filter of claim 14 including a cap for selective use in sealing the reservoir to retain the predetermined volume of fluid drainage within the reservoir.

16. The air-fuel separation cartridge of claim 14, wherein F is at least two.

17. The air-fuel separation cartridge of claim 14, wherein F is at least three.

18. The air-fuel separation cartridge of claim 14, wherein the filter has a nominal filtration diameter ranging from 1 micron to 10 microns.

19. The air-fuel separation cartridge of claim 18, wherein the nominal diameter ranges from 3 microns to 5 microns.

20. The air-fuel separation cartridge of claim 14, wherein the filter has an outer layer of fibrous material and an inner layer of cellulose.

21. The air-fuel separation cartridge of claim 20, wherein the fibrous material is compressed microglass.

22. In a fuel delivery system including a fuel transfer pump having
a pump housing including a fuel transfer chamber with a fuel inlet and a fuel outlet,
a rotatable drive shaft, motive means operable for rotating the shaft,
the shaft coupled with a rotatable impeller located in the fuel transfer chamber for use in causing fuel to move from the inlet through the outlet, and
a seal isolating the fuel transfer chamber from the motive means,
the improvement to the fuel transfer pump comprising:
the fuel transfer chamber having a divider wall forming an opening penetrated by the shaft, and
the fuel transfer chamber having a radially outboard wall defining a plenum located between the impeller and the radially outboard wall, the radially outboard wall joining the divider wall, and
the divider wall having a groove therein, the groove extending from the opening towards the radially outboard wall.

23. The fuel delivery system as set forth in claim 22, wherein the filter housing contains a plate comprising plurality of ports in fluidic communication with space interior to the filter housing and external to the filter element, and a central threaded opening communicating with space interior to the filter element.

24. The fuel delivery system as set forth in claim 23, wherein the frusto conical shape points towards the plate.

25. In a fuel delivery system including an air-fuel separation assembly having a filter head and an air-fuel separation filter assembly threadably engaged with the filter head to form a chamber between the filter head and the air-fuel separation filter assembly, the chamber having a fuel inlet and an air bleed port, the improvement comprising:
at least one of the filter head and the air-fuel separation filter assembly comprising a divider wall operable for dividing the chamber into
an air bleed section in communication with the air bleed port and
a fuel inlet section in communication with the fuel inlet.

26. The fuel delivery system as set forth in claim 25, wherein the air-fuel separation filter assembly comprises a filter housing,
a filter element, and
a plate comprising plurality of ports in fluidic communication with space interior to the filter housing and external to the filter element, and a central threaded opening communicating with space interior to the filter element,
the divider wall being operable to allocated selected ports to the air bleed section and other ones of the ports to the fuel inlet section.

27. In a fuel delivery system including an air-fuel separation assembly including a filter head and
a filter assembly having a filter housing and a filter element, the improvement comprising,
the filter housing comprising a plate comprising plurality of ports in fluidic communication with space interior to the filter housing and external to the filter element, and
a central threaded opening communicating with space interior to the filter element; and
the filter head having a solid wall drop-tube protruding through the central threaded opening interior to the filter element,
the solid wall drop tube having a distal opening remote from the filter head, and
a screen sock surrounding the distal opening.

28. A fuel delivery system comprising:
a mount having internal flow passages for establishing fluidic communication between
an air-fuel separator;
a water-fuel separator;
a fuel transfer pump; and
at least one of the flow passages having a check valve comprising
a coil spring and
a valve member;
the air-fuel separator comprising a filter and an external wall defining a plenum between the filter and the external wall, the plenum having a predetermined design according to the-relationship $$(V/CR) < F*D/RR$$

where V is the volume of the plenum, CR is the peak consumption or throughput rate of fuel, F is a residence factor of at least one, D is the bubble rise distance equal to the height of filter cartridge, and RR is the bubble rise rate;

the mount comprising a filter head including;

an inlet for receiving fuel to be filtered, an outlet for the fluids to exit the filter head after the fuel has been filtered, a threaded connector for use in coupling the filter head with the air-fuel separator, and a plug of a predetermined volume sufficient to accommodate drainage of the fluids from the mount; and the fuel transfer pump having a pump housing including a fuel transfer chamber with a fuel inlet and a fuel outlet.

* * * * *

UNITED STATES PATENT AND TRADEMARK OFFICE
CERTIFICATE OF CORRECTION

PATENT NO. : 6,729,310 B2
DATED : May 4, 2004
INVENTOR(S) : Charles L. Ekstam

It is certified that error appears in the above-identified patent and that said Letters Patent is hereby corrected as shown below:

Column 23,
Line 38, cancel text beginning with "22. In a fuel delivery system" and ending "opening towards the radially outboard wall."
Line 58, insert the following claim:

22. In a fuel delivery system including an air separation assembly having an air-fuel separation filter comprised of a filter housing and a filter element retained within the housing, the improvement comprising;
   the filter element having a frustoconical shape.

Signed and Sealed this

Tenth Day of August, 2004

JON W. DUDAS
*Acting Director of the United States Patent and Trademark Office*